(12) United States Patent
Leiber (10) Patent No.: US 9,541,102 B2
(45) Date of Patent: Jan. 10, 2017

(54) ACTUATING DEVICE, IN PARTICULAR FOR A VEHICLE BRAKING SYSTEM

(75) Inventor: Heinz Leiber, Oberriexingen (DE)

(73) Assignee: IPGATE AG, Pfäffikon Sz (CH)

( * ) Notice: Subject to any disclaimer, the term of this patent is extended or adjusted under 35 U.S.C. 154(b) by 694 days.

(21) Appl. No.: 13/883,192

(22) PCT Filed: Oct. 14, 2011

(86) PCT No.: PCT/EP2011/005167
§ 371 (c)(1),
(2), (4) Date: May 2, 2013

(87) PCT Pub. No.: WO2012/059175
PCT Pub. Date: May 10, 2012

(65) Prior Publication Data
US 2013/0213034 A1     Aug. 22, 2013

(30) Foreign Application Priority Data

Nov. 3, 2010 (DE) .......... 10 2010 050 132
May 16, 2011 (DE) .......... 10 2011 101 655
Jun. 6, 2011 (DE) .......... 10 2011 050 869

(51) Int. Cl.
*B60T 17/22* (2006.01)
*F15B 15/00* (2006.01)
(Continued)

(52) U.S. Cl.
CPC .............. *F15B 15/00* (2013.01); *B60T 7/042* (2013.01); *B60T 8/4077* (2013.01); *B60T 8/4081* (2013.01); *B60T 13/745* (2013.01)

(58) Field of Classification Search
CPC .......................... B60T 8/4077; B60T 270/403
See application file for complete search history.

(56) References Cited

U.S. PATENT DOCUMENTS

2009/0045672 A1   2/2009   Nishino et al.
2009/0115242 A1*  5/2009   Ohtani ............... B60T 7/042
                                                    303/3
2010/0275593 A1  11/2010   Okada et al.

FOREIGN PATENT DOCUMENTS

DE    10222270 A1   2/2003
DE    10308221 A1   9/2003
(Continued)

OTHER PUBLICATIONS

International Preliminary Report on Patentability issued in PCT/EP2011/005167, issuance date May 8, 2012.
(Continued)

*Primary Examiner* — Thomas E Lazo
*Assistant Examiner* — Daniel Collins
(74) *Attorney, Agent, or Firm* — Panitch Schwarze Belisario & Nadel LLP (57) ABSTRACT

The invention relates to an actuating device, in particular for a vehicle braking system, having an actuating mechanism, a power-operated actuator, a first travel sensor for sensing the travel of the actuating mechanism, and having an evaluation unit, an additional travel sensor, which can be actuated separately from the first travel sensor, wherein the travel sensors are actuated by way of two elements which can be moved relative to each other and wherein the differential travels and/or differential forces of the travel sensors are measured and evaluated by the evaluation unit. According to the invention an actuating element (103*a*) is provided which is movably connected to one of the elements which can be moved relative to each other and is movably arranged with respect to the other movable element.

16 Claims, 4 Drawing Sheets

(51) Int. Cl.
*B60T 7/04* (2006.01)
*B60T 8/40* (2006.01)
*B60T 13/74* (2006.01)

(56) References Cited

FOREIGN PATENT DOCUMENTS

| | | |
|---|---|---|
| DE | 102004011622 A1 | 3/2005 |
| DE | 102004025638 A1 | 9/2005 |
| DE | 102005018649 A1 | 10/2006 |
| DE | 102007016512 A1 | 11/2007 |
| DE | 102006040424 A1 | 3/2008 |
| DE | 102007049620 A1 | 10/2008 |
| DE | 102007030312 A1 | 1/2009 |
| DE | 102008060031 A1 | 6/2010 |
| DE | 102008063771 A1 | 6/2010 |
| DE | 102010051032 A1 | 7/2011 |
| DE | 102010045617 A1 | 3/2012 |
| DE | 102010050132 A1 | 5/2012 |
| WO | WO-9941125 A1 | 8/1999 |
| WO | WO-0243996 A1 | 6/2002 |
| WO | WO-2006087338 A1 | 8/2006 |
| WO | WO-2006111393 A1 | 10/2006 |
| WO | WO-2010069679 A1 | 6/2010 |

OTHER PUBLICATIONS

International Search Report and Written Opinion issued in PCT/EP2011/005167, mail date Mar. 3, 2012 with English translation of Search Report.

\* cited by examiner

ACTUATING DEVICE, IN PARTICULAR FOR A VEHICLE BRAKING SYSTEM

CROSS-REFERENCE TO RELATED APPLICATIONS

This Application is a National Stage of PCT International Application No. PCT/EP2011/005167, filed on Oct. 14, 2011, and claims priority of German Patent Application No. 10 2011 101 655.8, filed on May 16, 2011 which claims priority of German Patent Application No. 10 2011 050 869.4, filed Jun. 6, 2011 and which claims priority of German Patent Application No. 10 2010 050 132.8, filed Nov. 3, 2010. The disclosures of the aforementioned applications are incorporated herein in their entirety by reference.

PRIOR ART

The invention relates to an actuating device, in particular for a vehicle braking system.

Braking devices of this kind are known. Thus, for example, a braking system is known from DE 10 2005 018649A1 having a piston-cylinder system driven by an electric motor and in which the travel simulator is switched off in the event of failure of the power supply, and therewith the power-operated actuator, by way of travel simulator blocking.

Problems can occur in actuating devices of this kind if parts of the actuating mechanism, for example the piston of the piston-cylinder system, jam or the like.

Therefore, an actuating device is already also known from DE 10 2004 011622 for example which acts on two redundant sensors and one travel simulator mechanism simultaneously. If the transmission piston jams in the case of this device the brake pedal cannot transmit a force, or can only transmit a reduced force, to the main cylinder. This fault is not detected by the redundant sensors. Another example is clutch actuation. If the slave cylinder jams in this case the clutch engagement can only occur with increased force or not at all.

In DE 102010051032.8 belonging to the Applicants an actuating device has already been proposed in which an additional travel sensor is provided which can be actuated separately from a first travel sensor and wherein the differential travels and or differential forces of the travel sensors are measured and evaluated by an evaluation unit. In this solution pedal travel sensors are used as the pedal force sensors in conjunction with an elastic or a resilient element and force is measured by way of differential travel measurement. This solution effectively and inexpensively creates an actuating device or a travel simulator with which malfunctions can be reliably determined so appropriate measures can be taken.

The differential travel is relatively small in this solution because it acts as a pedal loss of travel when the brake booster fails. This can lead to a restriction of the measuring range.

OBJECT OF THE INVENTION

The invention is based on the object of creating an improved actuating device or a travel simulator in which direct and indirect malfunctions of the actuating device, which can be caused for example due to jamming of parts, can be inexpensively detected.

SOLUTION TO THE OBJECT

This object may be solved by the features found in the various attached claims . In other words, the solution according to the invention is based on pedal travel sensors being used as pedal force sensors in conjunction with an elastic or a resilient element and a force measurement is made by way of differential travel measurement.

This solution effectively and inexpensively creates an actuating device or a travel simulator with which malfunctions can be reliably determined so appropriate measures can be taken.

In particular faults throughout the functional chain, sensors, elastic member, piston and travel simulator, piston and spring can be detected. If, for example, a piston experiences increased friction, this is detected by the allocation of signals in the two pedal travel sensors, as emerges for example from FIG. 4.

Expedient embodiments and developments of the invention are contained in the various claims.

In this connection two parts, which can be moved relative to each other, can be provided and these are supported against each other in particular by a resilient element, such as a cup spring. The moving parts can be arranged directly on the piston of a main cylinder or on the piston of an actuating device for a travel simulator, in particular a piston-cylinder unit which is expediently connected by at least one coupling to the piston of a main cylinder.

According to the invention a travel simulator and a method for monitoring the function of a travel simulator are also provided which work on the basis of the described principles.

An actuating device of the type mentioned in the introduction and which comprises an extended measuring range is also created by the invention and its embodiments.

With the solution according to the invention an actuating device is created surprisingly easily and while retaining the advantages of the invention and its embodiments described in DE 102010051032.8 (to which reference is made here), in which device the measuring range is extended. The differential travel may be increased by a factor of two to three with this solution.

According to the invention protection is also being claimed for an advantageous solution in which a piston-cylinder unit is provided, wherein a transmission element, in particular transmission push rod, is connected, in particular coupled, to the piston of the piston-cylinder unit. This prevents essential components from being in a resting state and only being moved in special cases, such as in fallback positions. Regulations for example, such as ECE-R 13H, are easily satisfied thereby in terms of construction. A further advantageous embodiment provides that a transmission push rod is pressed or applied against an auxiliary piston by means of a spring, so it is moved between spindle and push rod by the differential travel. At the same time the friction of the transmission push rod can be detected by corresponding push rod movement and motor current.

In the following description the actuating devices of DE 102010051032.8 (to which reference is made here for the purpose of disclosure) and the actuating device according to the invention and advantageous embodiments and designs and further features and advantages of the invention and their embodiments are described in more detail with the aid of the drawings, in which.

Figure 1:
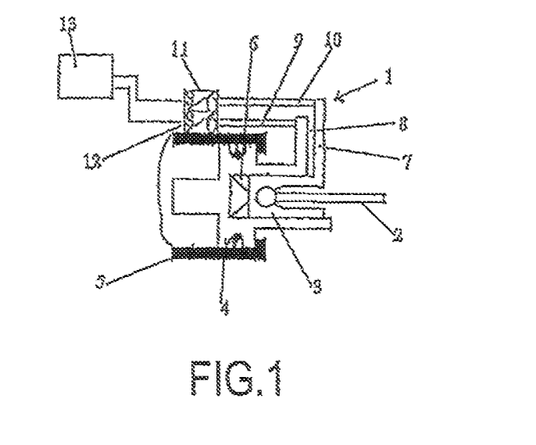
FIG. 1 schematically shows an actuating device, for example for a clutch.

The actuating device 1 schematically shown in FIG. 1 comprises an actuating element 2 which is mounted with its spherical end in a pot-shaped transmission member 3. The transmission member 3 is for its part displaceably arranged in a piston 4 which is open at one end and this can in turn be axially displaced in a cylinder 5 so as to be sealed. An elastic member, in particular cup spring 6, is arranged between the transmission member 3 and the piston 4 and can also be arranged or integrated at other locations between the two elements (transmission member 3 and piston 4) which can be moved relative to each other.

The elastic member can also comprise a flexible spring or a flexible spring assembly or an element made from an elastomer. The cup spring can have the following properties for example: s=0.6 mm at Fped=200N (pedal force for blocking pressure at high coefficient of friction). The transmission member 3 and the piston 4 each comprise projections 7 and 8 respectively which each act by means of actuating elements 9 and 10 respectively on one travel sensor 11 and 12 respectively. Of course other mechanisms are also possible to transmit the movement of the elements, which can be moved relative to each other, to the travel sensors 11, 12. The redundant travel sensors 11 or 12 are actuated separately in that the actuating element 2 acts via the elastic member or the cup spring 6 on the piston 4 so their movements are transmitted separately to the two travel sensors 11, 12. The signals from the travel sensors 11, 12 and their allocation (as shown for example in FIG. 4) are evaluated by an electronic evaluation unit 13 (ECU), so malfunctions can be detected if, for example, the piston 4 or additional components which cooperate therewith or additional pistons, for example of slave cylinders, jam. The elastic member or the cup spring 6 acts on the piston 4 here. The evaluation mechanism 13 detects the piston force and the piston travel by measuring the distances sp traversed by the projections 7, 8 or actuating elements and in the event of a discrepancy in the known force-travel characteristic of the elastic member determines a fault.

Figure 2:
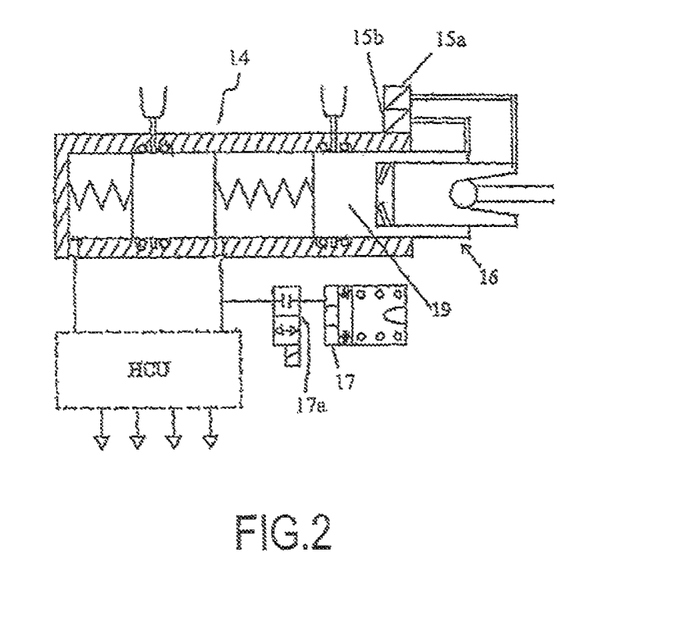
FIG. 2 shows a main cylinder system for a vehicle brake with travel simulator.

FIG. 2 schematically shows a tandem main cylinder 14 for a braking system of a motor vehicle comprising two travel sensors 15a, 15b, an actuating mechanism 16 and a travel simulator 17 actuated by pistons. The simulator can be switched off by way of a solenoid valve 17a. An indicated hydraulic control unit (HCU) is also provided which can comprise various valves, reservoirs and sensors, as is described for example below in connection with FIG. 3. The actuating mechanism and electronic evaluation mechanism is largely constructed according to that in FIG. 1 and will not be described further in this regard. The cylinder is formed by the DK piston 19 of the tandem main cylinder 14 here, however. In systems of this kind, for example electrohydraulic brake boosters EHB, the tandem main cylinder assumes the pressure control function and the emergency function in the event of a failure of the EHB.

Figure 3:
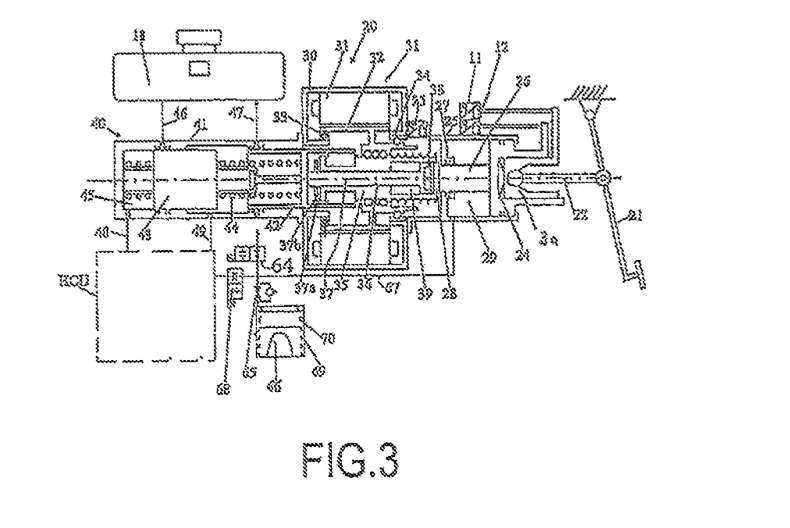
FIG. 3 shows an actuating device of a motor vehicle braking system.

The actuating device 20 shown in FIG. 3 for a motor vehicle brake comprises an actuating mechanism, in particular brake pedal 21 with pedal push rod 22. The pedal push rod 22 cooperates, as described above in relation to FIG. 1, via a transmission member 3a and a resilient or an elastic mechanism with a piston 24 which is axially displaceably arranged in a cylinder 25 and forms a working space 29. The piston 24 has a central projection 26 which is guided in a partition 27 of the cylinder 25 so as to be sealed.

A housing 30 of a power-operated actuator for the brake boost (BKV) and preferably the pressure modulation for ABS, ESP and the like axially adjoins the cylinder 25. The actuator comprises an electric motor 31 with rotor 32 which are arranged in the housing 30. The rotor 32, which is mounted in the housing 30 by means of bearings 33, 34, is part of a ball spindle drive. The spindle 35 belonging to this drive is non-rotatably mounted and has a central hole 36 in which a transmission push rod 37 is mounted. On one of its ends the transmission push rod 37 carries a permanent magnet 38 which is arranged in a recess 39 in the spindle and cooperates with a part 28 made from ferromagnetic material on the projection 26 to form a first coupling. At the other end the transmission push rod 37 can be provided with a part 37a made from ferromagnetic material which forms a second magnetic coupling with a permanent magnet 37b arranged in a piston 32, which is a component of the tandem main cylinder described hereinafter. Of course the projection 26 or the transmission push rod 36 can also be made entirely from a ferromagnetic material. A turning angle transmitter 23 is optionally arranged on or in the housing 30.

With regard to the further details of this coupling mechanism reference is made to the German patent application DE 10 2010 045617.9 belonging to the Applicants which is incorporated in this respect here for disclosure purposes.

The tandem main cylinder 40 is provided on the housing 30 so as to axially adjoin it and, as is known, comprises a cylinder 41 and two pistons 42, 43, displaceably arranged therein, which form two working spaces 44, 45.

The piston 42 forms recesses on either side, one of which receives the end of the transmission push rod 37 and the coupling mechanism provided on this end. The end of the piston immerses into the motor housing roughly up to the partition provided between the recesses, and accordingly into the interior of the rotor.

Hydraulic lines 46, 47 lead from the working spaces to a compensating reservoir 18 and hydraulic lines 48, 49 by way of a valve system provided in the HCU to the wheel brakes (not shown) of the braking system. The hydraulic actuating unit HCU shown in broken lines in the drawings can be constructed in different ways according to different systems or applications. One example of this is described in DE 10 200 7062839. The components of the pressure controller can also be provided there for an electro-hydraulic brake (EHB), as is described for example in Bremsenhandbuch [Braking Handbook], 1$^{st}$ edition, Viehweg-Verlag.

Figure 3A:
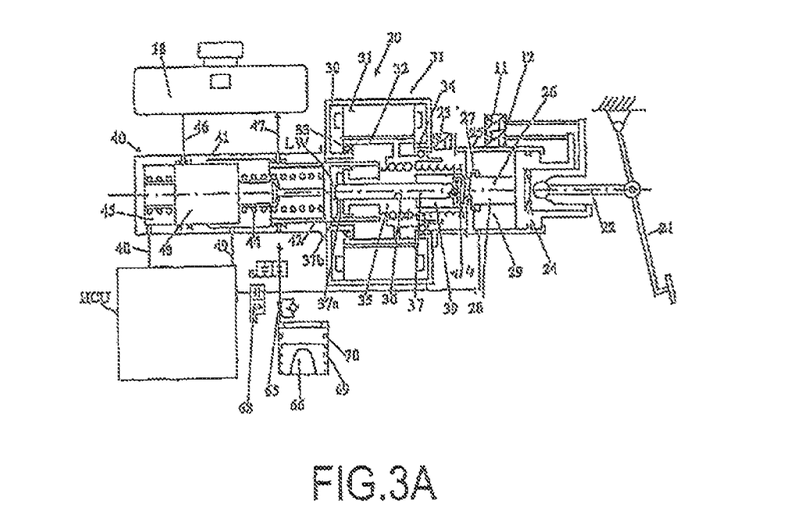
FIG. 3a shows an actuating device of a motor vehicle braking system according to FIG. 3, wherein piston and transmission push rod are connected to each other.

The embodiment of the actuating device shown in FIG. 3a shows a variant in which the piston 24 or its projection 26 is connected to the transmission push rod 37. The connection can expediently be made by means of a bolt or pin led transversely through corresponding holes in the parts, a projection of the push rod 37 protruding into a corresponding recess of the projection 26 or vice versa. Other methods of connection are also possible, however. Free travel LW is provided between the transmission push rod 37 and the piston 42 and this is expedient in the case of pedal actuation so the pedal push rod or the transmission push rod does not strike the piston immediately. This free travel can also be used to calibrate the pedal travel sensors. This solution has the additional advantage that even in the case of a transmission push rod which jams the fault can be detected owing to the differential travel between the two pedal travel sensors and then a changeover can be made to a different operating mode, for example to slave booster. In this advantageous variant the transmission push rod is moved relative to the spindle 35, so the parts to be actuated for fallback positions are not in a rest position in the normal case, as is demanded for example by regulation ECE-R13H applicable to braking systems.

The mode of operation and further features and advantages resulting therefrom are described hereinafter. The brake pedal 21 acts via the pedal push rod 22 on the piston 24, with the volume displaced thereby passing via the hydraulic line 67 to the hydraulic travel simulator 66. The redundant travel sensors 11, 12 are coupled to the movement of the piston 24, as described above in relation to FIG. 1. The travel sensors 11, 12 control the motor 31 via an evaluation mechanism 13 and simultaneously actuate the normally open 2/2 way solenoid valve 64.

The travel simulator 66 produces the desired reaction on the pedal force. A pedal travel-dependent pressure is produced in the working space 29 in accordance with the simulator spring 69 arranged in the travel simulator. If the travel simulator piston should jam, the pedal travel pressure function is disrupted, i.e. pressurising medium flows via the solenoid valve 64, which is open in this case, via the line 47 to the reservoir 18. In the event of the power-operated actuator failing the piston 24 can still be used to optimize the braking effect. If the brake boost fails the pedal force should be as small as possible, and this necessitates small main cylinder piston diameters.

If these are used large pedal travels are necessary in the low pressure range due to the flat course of the pressure-volume characteristic curve.

In the lower pressure range pressurising medium can be conveyed from the piston 24 to build up pressure in the working space 44 and the associated DK braking circuit via the normally currentless closed 2/2 way valve 68. In the case of a pressure reduction pressurising medium can be conveyed back into the working space 29 again to the piston 24 via the pressure sensor 54.

A critical case is if in the case of ABS operation on ice the brake boost fails and a positive μ jump subsequently occurs on braking. In this case a lower pressure in the braking circuits is 1-2 bar in a borderline case, so the initial range of the pressure-volume characteristic curve at the booster runout point of the travel simulator starts at about 40% pedal travel, and this simultaneously constitutes piston travel and therewith a loss in volume.

In systems in which the DK piston 42 actuates the travel simulator 66 the spacing from the SK piston 43 is correspondingly small in this case with the result that in this critical case only a relatively low pressure is possible in the DK circuit in the case of a subsequent pressure build-up, and this significantly affects the potential braking effect. So the DK piston does not strike the pedal push rod in the lower pressure range in the case of ABS regulation a corresponding piston travel and therewith spacing from pedal push rod=free travel is achieved in that a corresponding volume is led into a storage chamber 52 or 53. The advantage of this system lies in the critical case in the fact that some of the volume can be regained again in the braking circuit.

With respect to the diagnostics of components relevant to function, the system can also comprise at least one non-positive coupling, as described above. The first non-positive coupling, preferably embedded with a permanent magnet in a magnetic housing, acts on a pole piece of the spindle. This coupling is firstly necessary for the piston setting via the spindle to be intensified by way of the coupling force, in particular at low pressures. The second coupling acts on the leading end of the transmission push rod which is permanently connected by the magnetic housing to the piston. This non-positive second coupling is preferably also created with a permanent magnet. A small free travel is provided between the pole and transmission push rod and this is used inter alia for the pedal characteristics and calibration of the pedal travel sensors. Reference is made to the above-mentioned German patent application DE 102010045617 belonging to the Applicants with regard to the additional features and mode of operation of this coupling mechanism.

Figure 4:
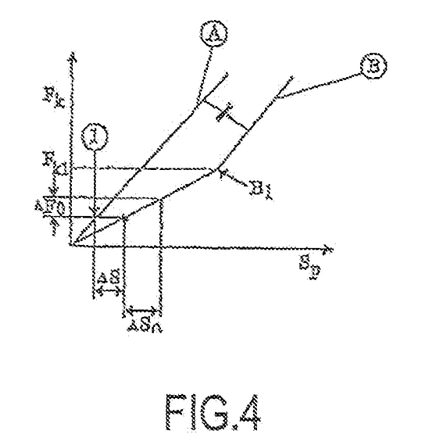
FIG. 4 shows a characteristic curve graph of a travel simulator actuating device.

FIG. 4 illustrates a graph which shows the piston force as a function of the piston travel. The characteristic curve A shows the piston stroke and the associated piston force which results from the system connected downstream, for example the reservoir pressure. Characteristic curve B results from the interconnected elastic member or spring, preferably cup spring. The characteristic curve is flatter in accordance with the chosen rigidity, and this means that in the working point 1 between the piston travel $sp_k$ and the travel of the push rod $sp_s$ there must be a difference $s_1$ in the system-induced piston counterforce. If this counterforce fails due to a fault, there is no differential travel $s_1$ in the case of the corresponding piston travel $sp_k$, so a fault is reported to the diagnosis circuit. If, on the other hand, the piston blocks at 1, then an additional travel $sp_k$ can be measured once $F_0$ has been exceeded, and this, in turn, corresponds to a fault. If a sensor has a drift or a signal deviation, a difference in the two sensor signals $sp_k$ and $s_p$, i.e. $s_1$, at most may occur at 1. In the case of a bigger pedal stroke, s changes up to stop B1 of the spring. From this point on the spring characteristic curve sp runs as an equidistant to $sp_k$. The stop at B1 is advantageously selected such that it lies at the limit of the normal working range with FK1, so all described faults are detected, such as sensor deviation, excessive piston force or faults in the system downstream (pressure failure due to solenoid valve or blocking of a piston).

Figure 5:
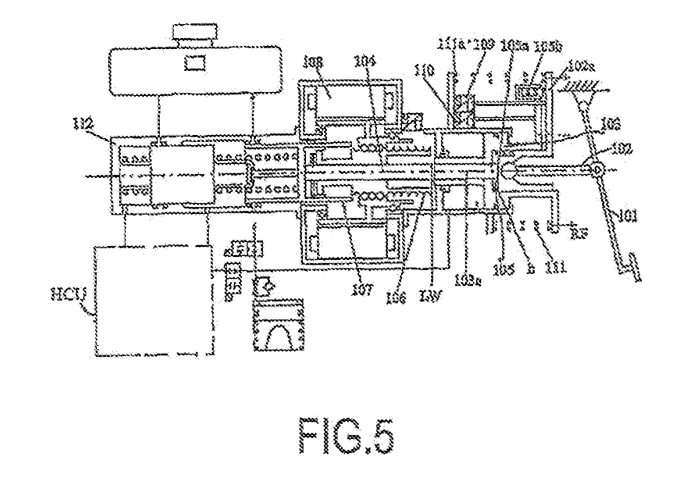
FIG. 5 shows an actuating device of a motor vehicle braking system with an actuating device according to the invention.

FIG. 5 shows an actuating device according to the invention with extension of the differential travel and also with restoring springs. FIG. 5 describes the arrangement comprising pedal interface with brake pedal 101, pedal push rod 102, transmission member, resilient or elastic mechanism 105, EC motor 108, tandem main cylinder 112 and HCU. The device corresponds in relation to the drive (motor/gear), main cylinder (THZ) and HCU to the design in FIG. 3, so reference is made to the description relating thereto. In contrast to DE 102010050132, in the device according to FIG. 5 the projection of the piston 103 is provided with a hole for a push rod 103a which is axially displaceably arranged in the hole. On actuation of the brake pedal 101 the motor 108 is switched on for the brake boost via the pedal travel sensors 109 and 110, and this leads to a movement of the spindle 106 and the DK piston 107 which is non-positively coupled in particular. The small free travel LW provided between the transmission push rod 104 and the push rod 103 enlarges as the pedal movement increases in accordance with the travel simulator characteristic curve, and this is not described in any more detail here. If the brake boost fails, the push rod 103a, after a small free travel LW, strikes the transmission push rod, so the LW is 0 thereafter.

The travel simulator 66 induces a counterforce on the piston, which together with the restoring spring 111 or 111a acts counter to the pedal push rod force. This force induces a deflection of the elastic member, in particular the cup spring 105. This deflection is measured via the pedal travel sensors 109 and 110. The larger the deflection is, the greater the measuring range is. As already mentioned in DE 102010051032.8, faults can be detected via the deflection in the case of excessive piston friction at travel sensor and solenoid valves, and this contributes significantly to failsafety.

Instead of the non-wear-free cup spring 105 (lower half of FIG. 5), low-wear compression springs may also be used in the pedal push rod shaft 105a and/or axially parallel 105b thereto (upper half of FIG. 5). The springs are pre-tensioned. The pedal push rod 102 with auxiliary piston 103 and brake pedal 101 must be returned to the starting position. Restoring springs are used for this purpose which act either on the flange 102 of the pedal push rod 102 (springs 111a) or on the auxiliary piston 103 (spring 111).

The pedal push rod 102 acts via the transmission member directly on the transmission push rod 103a in the event of failure of the brake boost or for example in the event of failure (travel simulator) 66 which can be actuated in particular by means of the piston 103, it being possible for the brake boost to be operated as a slave booster with backing-up of the pedal force.

Figure 5A:
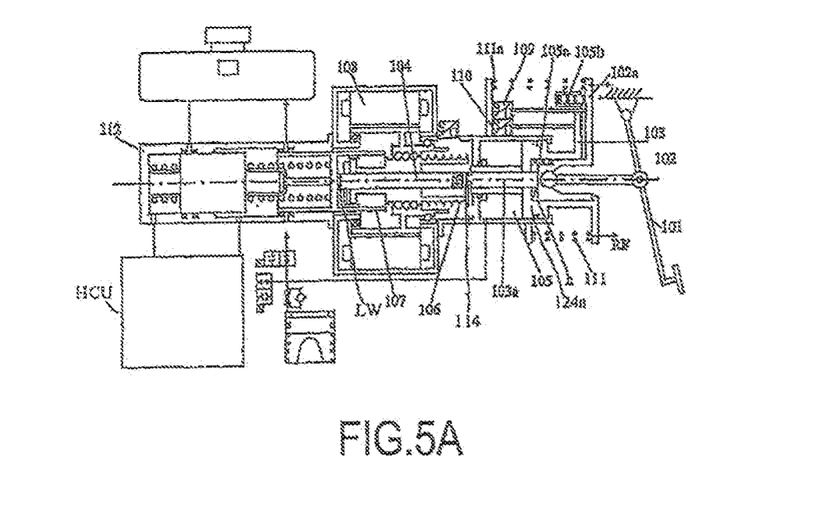
FIG. 5a shows an actuating device of a motor vehicle braking system with an inventive actuating device according to FIG. 5, wherein piston and transmission push rod are connected to each other.

The embodiment of the actuating device illustrated in FIG. 5a shows a variant in which the piston 24 or its projection 26 is connected to the transmission push rod 37 for the reasons described in relation to FIG. 3a. The connection can expediently be made by means of a bolt or pin guided transversely through corresponding holes in the parts, wherein a projection of the push rod 103a protrudes into a corresponding recess in the projection [of the] transmission push rod 104 or vice versa. Other types of connection are also possible, however. A small free travel LW is provided between the end of the transmission push rod 104 and the piston of the main cylinder.

Figure 5B:
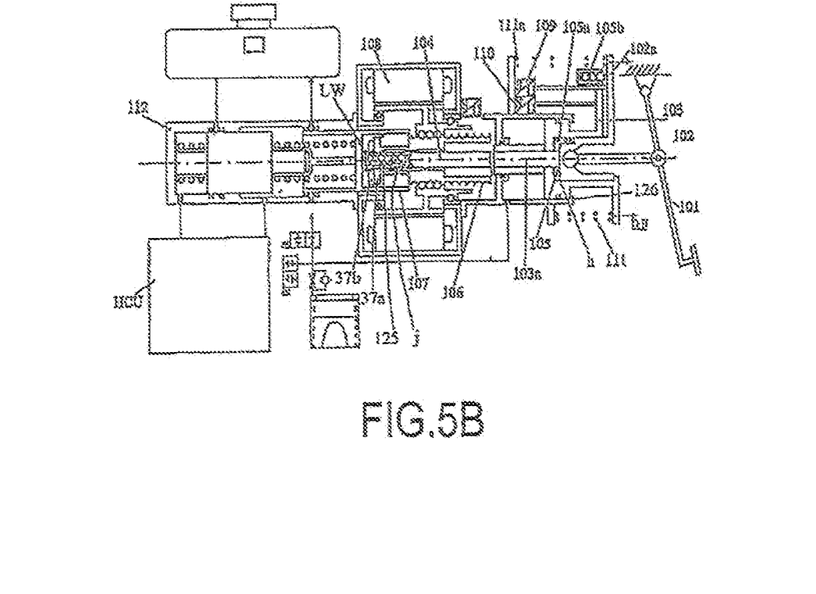
FIG. 5b shows an actuating device substantially according to FIG. 5 but with a resilient mechanism on the transmission push rod.

FIG. 5b shows a further advantageous embodiment. Here the transmission push rod 104 is loaded by a restoring spring 125, so it is pressed against the push rod 103a or rests thereon. If the brake boost is activated, then, as is known, the piston or spindle travel is greater in the travel simulator systems than that of the pedal push rod 103a, thus producing the desired relative movement. The possibility of jamming can also be reduced by a relatively short guiding length of the transmission push rod 104, which is made for example from a bearing material with subsequent play s between the transmission push rod 104 and the spindle 106. The risk of jamming is therefore minimal. In addition, the friction can be diagnosed if, for example, when the vehicle is stationary the spindle is moved out of its initial position beyond the free travel. If the friction is low then this is expressed in low power consumption. If the spindle is moved beyond the free travel, the permanent-magnetic coupling opens in that the piston 107 rests via the transmission push rod on the auxiliary piston and its stop and the spindle 106 is subsequently moved further. The air gap of the pole cup 37a made from ferromagnetic material and the permanent magnet 37b becomes larger in this connection. In the region of free travel the change in the motor current detects the friction and subsequently the coupling force. The two can then be diagnosed. This ensures failsafety.

LIST OF REFERENCE CHARACTERS 1 actuating mechanism
2 actuating element
3 transmission member
4 piston
5 cylinder
6 elastic member or cup spring
7 projection
8 projection
9 actuating element
10 actuating element
11 travel sensor
12 travel sensor
13 evaluation unit
14 tandem main cylinder
15a travel sensor
15b travel sensor
16 actuating mechanism
17 travel simulator
18 compensating reservoir
19 piston
20 actuating device
21 brake pedal
22 pedal push rod
23 turning angle transmitter
24 piston
25 cylinder
26 projection
27 partition
28 part made of ferromagnetic material
29 working space
30 housing
31 electric motor
32 rotor
33 bearing
34 bearing
35 spindle
36 hole
37 transmission push rod
37a part made of ferromagnetic material
37b permanent magnet
38 permanent magnet
39 recess
40 tandem main cylinder
41 cylinder
42 piston
43 piston
44 working space
45 working space
46 hydraulic line
47 hydraulic line
48 hydraulic line
49 hydraulic line
63 hydraulic line
64 2/2 way valve
65 throttle check valve assembly
66 travel simulator
67 hydraulic line
68 2/2 way valve
69 simulator spring
70 travel simulator piston
101 brake pedal
102 pedal push rod 102a flange
103 auxiliary piston
103a push rod
104 transmission push rod
105 elastic member cup spring
105a central compression spring
105b axially parallel compression spring
106 spindle
107 k piston
108 EC motor
109 pedal travel sensor master
110 pedal travel sensor slave
111 restoring spring on auxiliary piston
111a restoring spring on pedal push rod
112 THZ
114 bolt or pin
124a piston
125 restoring spring
126 stop
h spring lift
LW free travel from pedal push rod to transmission push rod
s play
BKV brake boost
HCU hydraulic pressure controller

What is claimed is:

1. An actuating device for a motor vehicle braking system, comprising:
   an actuating mechanism,
   a power-operated actuator,
   a travel simulator,
   a main cylinder,
   a first travel sensor for sensing travel of a first element of the actuating mechanism,
   a second travel sensor for sensing, separately from the first travel sensor, travel of a second element of the actuating mechanism,
   an elastic or resilient mechanism arranged between the first element and the second element,
   wherein differential travels of the first and second travel sensors are measured to provide differential travel measurements, and
   an evaluation unit configured to evaluate the differential travels of the travel sensors and to determine discrepancies from a force-travel characteristic of the elastic or resilient mechanism to detect malfunctions of the actuating device.

2. The actuating device according to claim 1, further comprising, in addition to the main cylinder, a piston-cylinder unit whose piston can be actuated by means of the actuating mechanism, and which is connected by a connecting mechanism to a piston of the main cylinder.

3. The actuating device according to claim 2, wherein the travel simulator is configured to be actuated by means of the piston-cylinder unit.

4. The actuating device according to claim 1, wherein the first travel sensor is connected by a first connecting mechanism to a piston of the main cylinder, wherein the second travel sensor is connected by a second connection to an element movably arranged on the main cylinder piston, and wherein the elastic or resilient mechanism is provided between the main cylinder piston and the first element.

5. An actuating device for a vehicle braking system, comprising:
   an actuating mechanism,
   a power-operated actuator,
   a travel simulator,
   a main cylinder,
   a first travel sensor for sensing the travel of a first element of the actuating mechanism,
   a second travel sensor for sensing, separately from the first travel sensor, travel of a second element of the actuating mechanism,
   an elastic or resilient mechanism disposed between two elements configured to be moved relative to each other, and
   an actuating element configured to be moved with one of the elements configured to be moved relative to each other, wherein the actuating element is arranged so as to be movable with respect to the other movable element, and
   an evaluation unit configured to evaluate differential travels of the travel sensors and to determine discrepancies from force-travel characteristics of the elastic or resilient mechanism to detect malfunctions of the actuating device.

6. The actuating device according to claim 5, wherein the actuating element is a push rod which is arranged coaxially to the actuating mechanism.

7. The actuating device according to claim 5, wherein the elastic mechanism comprises cup or compression springs.

8. The actuating device according to claim 5, further comprising a piston-cylinder unit whose piston is configured to be actuated by means of the actuating mechanism, wherein the actuating element is axially displaceably arranged in the piston of the piston-cylinder unit.

9. The actuating device according to claim 5, wherein the actuating element is configured to act directly or indirectly on a piston of the main cylinder by interconnection of a small free travel.

10. The actuating device according to claim 8, whereby the travel simulator is configured to be actuated by means of the piston-cylinder unit.

11. The actuating device according to claim 5, further comprising:
   a piston-cylinder unit in addition to the main cylinder, and
   a transmission element coupled to a piston of the piston-cylinder unit.

12. An actuating device for a vehicle braking system, comprising:
   an actuating mechanism,
   a power-operated actuator,
   a first travel sensor for sensing the travel of a first element of the actuating mechanism,
   a main cylinder,
   a second travel sensor for sensing, separately from the first travel sensor, the travel of a second element of the actuating mechanism,
   an actuating element configured to be moved with one of the elements configured to be moved relative to each other, wherein the actuating element is arranged so as to be movable with respect to the other movable element,
   a piston-cylinder unit in addition to the main cylinder, and
   a transmission element coupled to an element that is configured to be moved relative to a piston of the piston-cylinder unit and is arranged between the piston of the piston-cylinder unit and the transmission element, and
   an evaluation unit configured to evaluate the differential travels of the first and second travel sensors and to determine discrepancies from force-travel characteristics of an elastic or spring mechanism arranged between the elements configured to be movable with respect to each other to detect malfunctions of the actuating device.

13. The actuating device according to claim 11, further comprising a bolt or pin configured to provide the coupling.

14. The actuating device according to claim 5, further comprising:
- a piston-cylinder unit, in addition to the main cylinder, including a piston, and
- a transmission push rod configured to be pressed by means of an elastic or a resilient mechanism against the piston of the piston-cylinder unit.

15. The actuating device according to claim 5, wherein the actuating device is configured to detect friction of a transmission push rod and/or coupling force by detecting spindle movement and motor current.

16. The actuating device according to claim 12, further comprising a bolt or pin configured to provide the coupling.

* * * * *